United States Patent [19]
Jornhagen

[11] 3,762,726
[45] Oct. 2, 1973

[54] FLUID SEAL
[75] Inventor: Lennart B. Jornhagen, Corona, N.Y.
[73] Assignee: Chicago Rawhide Manufacturing Company, Chicago, Ill.
[22] Filed: Apr. 5, 1971
[21] Appl. No.: 131,374

[52] U.S. Cl. .................. 277/39, 277/153, 277/133
[51] Int. Cl. ......................... F16j 9/00, F16j 15/32
[58] Field of Search ................... 277/37, 39, 133, 277/25, 153, 67

[56] References Cited
UNITED STATES PATENTS
3,086,781  4/1963  Hudson et al. .................. 277/39
3,106,405  10/1963  Pringle .......................... 277/184 X

*Primary Examiner*—Samuel B. Rothberg
*Attorney*—James T. FitzGibbon

[57] ABSTRACT

A seal assembly primarily used for retaining oil or other lubricants in an oil bath which lubricates a sealed bearing assembly. In one successful form, the invention is embodied in a unitized seal assembly having an elastomeric seal element and associated casing which rotate with respect to each other. The elastomeric portion includes a primary or wet sealing lip, and an auxiliary or dry sealing lip which excludes dirt and other foreign matter from the primary sealing lip area. An axially extending collar forming a part of the seal element extends at least into an annular opening defined by an imperforate outer wall of the casing.

6 Claims, 3 Drawing Figures

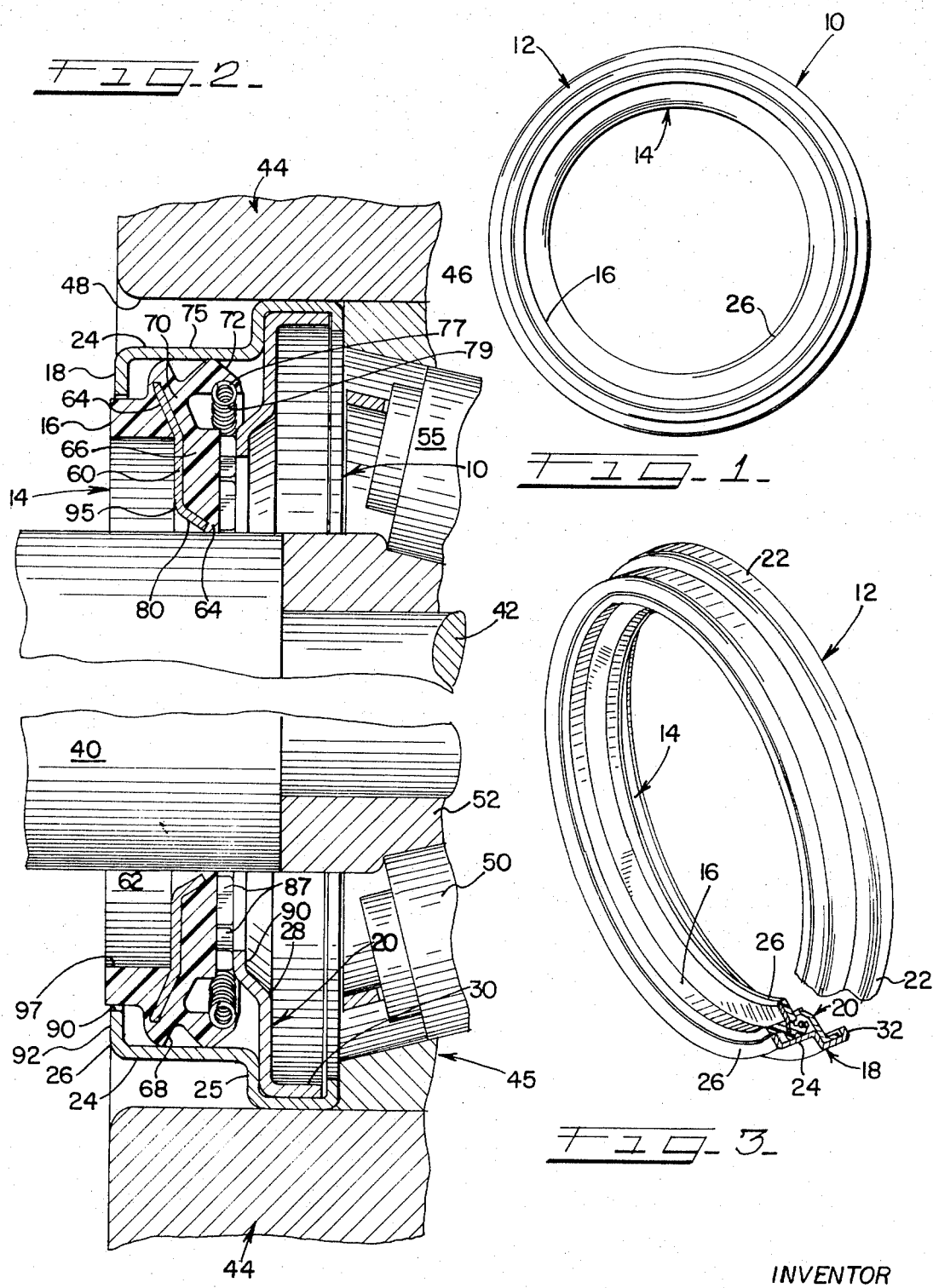

FLUID SEAL

This invention relates to new and improved fluid seal assemblies. The seal assemblies of the present invention are particularly adapted for wheel bearing seals for bearings running in an oil bath, and may be installed in the wheel housing of trailers, semi-trailers, and the like. These assemblies are provided with an elastomeric sealing element and a casing which provides the primary surface against which the elastomeric element bears to form the primary seal. The assembly of this invention includes, in addition, means which operate to exclude or minimize the ingress of dirt into the assembly to an extent that the effective lubricant action initially established is effectively maintained throughout operation, even under conditions of an adverse nature. The invention is particularly useful in embodiments in which a unitized oil seal is utilized to retain oil or other low viscosity lubricant in a sealed bearing assembly in which the bearings are lubricated by means of a bath of lubricant. In typical assemblies of this general type, the level of lubricant may be viewed through a transparent hub cap. In preferred embodiments of this invention, a wet or primary seal acts to retain lubricant within the bearing area, and a secondary or dry seal excludes dirt and other damaging foreign materials from the primary seal.

Oil seal assemblies of this general type are known and have been described in prior art patents, for example, U.S. Pat. Nos. 2,938,744, and 3,086,781. Such oil seal assemblies have enjoyed outstanding commercial success and are highly regarded for their convenience of installation, excellent sealing characteristics, economy and dependability, and by reason of possessing a number of other advantages. Seals made in accordance with the present invention provide a substantial improvement over certain heretofore available oil seals of this general type, inasmuch as increased operating life and other advantages are achieved.

It is one of the objects of this invention to provide a new and improved seal assembly having prolonged life.

It is another object of this invention to provide a new and improved oil seal assembly of the self-contained type which provides prolonged life of the excluder lip.

It is a further object of the invention to provide an oil seal assembly which combines an elastomeric sealing element which is fixed to and in fluid-tight engagement with, a first of a pair of movable parts, and a casing element in fixed, fluid-tight engagement with a second of said parts and having a sealing path engaging said elastomeric element, and wherein a large diameter annular opening is formed between a portion of the casing element and the first part, and in which the sealing element includes an axially extending collar which extends to a position lying at least partially within the annular opening.

It is another object of this invention to provide a new and improved seal assembly of the self-contained type which provides a sealing element with both a primary seal lip and an excluder lip, which lips bear against respective seal paths on a casing element, in which assembly the dry side of the casing element defines the radial limit of a substantial annular mouth, and in which the sealing element includes an axially extending collar which is spaced apart from the casing at the dry side of the seal, and which extends at least partially into the annular mouth.

Other objects and advantages, and the manner of their attainment will become more clearly apparent from the following detailed description of the preferred embodiments of the invention, and by reference to the drawings, in which like reference numerals indicate corresponding parts throughout.

FIG. 1 is an end elevational view of one form of seal unit embodying the invention;

FIG. 2 is a perspective view of the oil seal of FIG. 1, showing a portion thereof broken away; and FIG. 3 is a greatly enlarged vertical sectional view of the embodiment of the seal shown in FIG. 1, shown in association with a part of a trailer wheel bearing assembly.

Description of the Preferred Embodiment of the Invention

Although the invention is readily adaptable for use in fluid seals having a wide variety of configurations, and for seals used in different environments, the invention is illustrated by reference to a particular embodiment wherein a bearing assembly for rotatably mounting vehicle wheels is sealed against oil leakage. In the illustrated assembly, bearings are lubricated in a bath of oil or other low viscosity lubricants, the level of which is readily ascertainable through a transparent hub cap (not shown) associated with a remote or outer end of a spindle or shaft on which the wheel bearings are mounted.

Referring now to the drawings in greater detail, FIG. 1 is a view from the dry or inner axial end of a seal assembly generally indicated at 10 and shown to include a generally outer casing element 12 and a generally inner sealing element 14 which cooperate to form a primary seal and which are relatively rotatable with respect to each other. The inner element 14 includes an axially outwardly extending collar element 16 which is an important feature of the present invention and to which further reference will be made herein.

In FIG. 2 it will be noted that the outer element 12 is formed of outer and inner stampings 18, 20 locked together. The outer stamping 18 includes a mounting flange 22, and an axially extending leg 24, with a radially extending leg 25 therebetween, and also includes a radially inwardly extending, imperforate outer flange 26. The inner stamping 20 includes a radially extending flange 28 and an axially extending portion 30 which is seated within the mounting flange 22 and locked against radially inwardly extending leg 25 by a bent over portion 32 of the mounting flange 22. Radially extending flanges 26 and 28 form a generally U-shaped enclosure with the axially extending leg portion 25 as a base at which primary seal forming elements are positioned.

The inner element 14 of the seal assembly 10 includes a radially inwardly extending, elastomeric sealing element 34, which extends radially inwardly from the enclosure formed by the respective portions 26, 24, 28 of the stampings 18, 20. Referring specifically to FIG. 3, the seal assembly 10 is illustrated in its operative position within a vehicle wheel assembly of a well known type. Only a small portion of the vehicle wheel assembly is illustrated. FIG. 3 shows a fixed axle 40 having a spindle portion 42 extending therefrom and received into the opening of a hub 44 of a wheel and is journaled therein by conventional roller bearing assembly, generally indicated at 45. The roller bearing assembly 45 illustrated in FIG. 3 includes an outer race 46 which is fixed in the bore 48 of the hub 44, a plurality of conventional roller bearings 50 (only one indicated), and an inner race 52 which is held by a tight press fit onto spindle 42.

As is typical of a heavy duty vehicle wheel assembly, the wheel, including its associated hub 44 is rotatable relative to the axle 40 and spindle 42. It may be assumed that, in the illustrated embodiment, bearing assembly 45 is housed within an enclosed region 55 which contains a bath of oil or other low viscosity lubricant and that it is the function of seal assembly 10 to retain the lubricant in enclosed region 55.

Referring again specifically to FIG. 3, the inner portion 14 of the seal 10 is shown to include a generally radially extending metallic stamping 60 and an elastomeric portion, generally indicated at 62, which is permanently bonded to the stamping 60. The elastomeric portion 62 includes a radially inward seal-forming portion 64, a radially intermediate facing portion 66, an excluder lip 68, a primary sealing lip portion 70 extending axially in the direction of bath region 55, and a collar element 16 extending axially in the opposite direction. Primary seal lip portion 70 includes a radially outwardly extending primary sealing lip 72 extending therearound, and bearing against inner surface 75 of axially extending flange or portion 24 of the metal stamping 18. Lying radially inwardly of primary sealing lip 72 and within portion 70 is a spring groove 77, sized to retain a coiled garter spring 79 therein. Garter spring 79 is under compression and assists in radially outward urging of primary seal extending portion 70 to assist in maintaining continuous sealing engagement of lip 72 with a primary seal contact path on the inner surface 75 of the stamping 18.

Excluder lip 68 is also in continuous sealing engagement with its respective sealing path on inner surface 75. Excluder lip 68 is somewhat axially spaced outwardly apart from primary sealing lip 72 and is angularly inclined into sealing engagement with surface 75. With this arrangement, primary sealing lip 72 functions to prevent loss of lubricant from the inner or interior region 55 of hub 44, and excluder lip 68 prevents dirt or other potentially damaging foreign material from contacting the primary sealing lip 72.

Still referring to FIG. 3, stamping 60 which forms part of the inner portion 14 of seal assembly 10 includes a radially inwardly extending, axially bent portion 80 which bears against the circumference of the axle 40 to secure inner portion 14 with respect to the axle 40. The metallic stamping 60 also includes a radially outwardly extending portion 62 and radially outer portion 64 which is bent axially outwardly. Radially outer portion 64 of stamping 60 is inclined axially in a direction away from oil sealing lip 72 and this inclined portion 64 supports and strengthens the axially extending collar 16.

The press-fit secondary seal provided by the elastomeric material at seal-forming portion 64 eliminates the necessity of resorting to costly finishing operations to improve the sealing effectiveness at the circumference of the axle 40. Effective operation of the oil seal assembly 10 merely requires an oil-tight press-fit of inner element 14 against axle 40 and between the mounting flange 18 and the bore 48. The primary sealing action, however, is provided within the preassembled unitized oil seal assembly 10 between primary sealing lip 72 and inner surface 75.

To provide for proper axial positioning of the inner elements 14, to permit development of centrifugal pressures of lubricant at the primary seal, and to permit flushing of the casing on the lubricant side of the primary seal, the inner element 14, and specifically intermediate facing portion 66 of elastomeric component 62, is provided with a plurality of integrally formed projections 87. These projections, in the form of axially extending chaplets, are circumferentially spaced apart and are radially positioned so as to engage an opposing portion 88 of the radially inwardly extending leg 28 of inner stamping 20 during the installation of seal 10 on the axle 40.

In the preferred embodiment illustrated, the radially extending leg 26 of outer stamping 18 is imperforate and extends only a relatively short portion of the radial distance between the circumference of axle 40 and the axially extending portion 24 of the stamping 18. The edge 90 of the leg 26 defines a radially outer limit of an annular opening between itself and the circumference of axle 40. Axially outwardly extending collar 16 extends partially within, and in the embodiment illustrated, to a position in which it is flush with, or extending axially outwardly of the outer face 92 of leg 26. In FIG. 3 it is shown that collar 16 is radially spaced apart from inner edge 90 of radially extending leg 26, and is therefore not in sealing contact with leg 26.

It is also apparant from a consideration of FIG. 3 that the radially outer face 95 of stamping 60 is free from a rubber coating and is therefore exposed to the atmosphere.

Referring now to the operation of the seal assembly 10, once the unit has been positioned appropriately, the interior area 55 is filled with oil to a predetermined level, generally a level lying sufficiently high to provide positive immersion lubrication for at least the lowermost roller 50 of the bearing assembly and to insure that at least the lowermost portion of the sealing lip 72 receives a supply of oil. By reason of the provision of the flange 32 which serves to lock the flanges 18, 20 together, and by reason of the engagement between the chaplets 87 and a surface 88 of the leg or flange 28, all of the seal elements forming the assembly 10 are positioned in the desired axial relation upon installation, and since the wearing surfaces occur entirely internally of the seal, that is, there is no sliding contact between any seal element and any portion of the axle hub itself, installation conditions may be quite carefully controlled. The above described feature of the invention, sometimes referred to as a so-called unitized seal concept, is one wherein the primary seal function is carried out within portions of the seal assembly itself rather than between a portion of the seal assembly and a portion of the mechanism with which it is associated in use. Seals made according to the present invention are also advantageous inasmuch as they are particularly suited to the unitized seal concept. In practice, seals constructed generally along the lines of the seal illustrated have proven very advantageous in use, since the provision of an oil bath type seal makes it possible to provide proper lubrication for heavy duty wheel installations and eliminates the need for frequent maintenance. All that is ordinarily required is changing the oil at extended intervals, and, in the meantime, merely occasionally glancing through a transparent hub cap will indicate whether a satisfactory oil level is being maintained, in which case no maintenance is required. Accordingly, greasing and other periodic maintenance need not be scheduled at intervals which coincide with the shortest anticipated service life of the unit. Since seals of the type with which the invention is concerned are already known to provide extended life of the primary lip when the same is properly lubricated, there has been an increased interest in insuring that damage to the primary lip does not occur, since this would result in leakage well before the primary lip is excessively worn. Such damage most commonly occurs by passage of foreign material past the secondary lip and into the area of the seal band formed between the primary lip and the casing. In other words, while lubricated and free from foreign material, the primary lip has an extended life, but the secondary lip is provided to insure that foreign matter does not enter the immediate area of the primary lip from other areas and thereafter cause primary lip damage.

Accordingly, it is common for secondary lips, which are normally either dry or at a reduced level of lubrication, to fail first in service, and it is equally common for primary lips to fail shortly thereafter. Attempts to overcome this problem by providing additional secondary lips or by resorting to other expedients have not been completely successful, since each additional secondary lip is a source of heat and friction and adds to the complexity of manufacturing and installation. However, by providing the collar 16 of the present invention, in association with the retention of the otherwise conventional primary and secondary lips, it has been discovered that, quite unexpectedly both secondary and primary lips have shown considerably extended life in use.

Although the reason for this improved life in use are not known or understood, and although the invention is not intended to be limited to any particular theory or cause of operation, it is believed that the provision of the collar 16 in its closely spaced apart but non-contacting relation to the stamping may provide a labyrinth action which serves to prevent coarse materials from reaching the area of the secondary lip, while at the same time, the construction does not permit heat buildup by unduly thermally insulating metal parts by protective rubber elements. In this connection, it will be noted that there is considerable exposure of the bare metal surface 95 inwardly of the collar 16 and it will also be noted that the flanges 24, 26 are free from physical contact with rubber other than at their contact points with the primary and secondary lips.

The illustrated embodiment of the invention is one wherein the exact arrangement of primary and secondary lips and the auxiliary collar of the invention have been dictated, at least to a certain extent, by the construction of the associated wheel hub. Accordingly, it will be appreciated by those skilled in the art that different forms of the invention may be made wherein the lips, flanges, etc., are positioned in a somewhat different manner than that illustrated.

It will thus be seen that the present invention provides a novel seal unit having a number of advantages and characteristics, including those herein pointed out and others which are inherent in the invention. Since modifications and variations of the illustrated construction will be apparent to those skilled in the art, it is anticipated that such modifications and changes may be made without departing from the spirit of the invention or the scope of the appended claims.

I claim:

1. A fluid seal assembly for mounting between relatively movable first and second parts, and for retaining a fluid bath within an enclosed region, said assembly including a first, seal element portion and a second, casing portion, said portions being adapted to form a primary seal therebetween when said first and second portions are positioned in fluid-tight relation to said first and second parts, said assembly including means for mounting said first and second portions in operating position with respect to each other, said seal assembly having an inner side adapted for positioning adjacent said region, and an outer side at the other side of said seal assembly, said sealing element portion having at least one part thereof extending to and engaging said second, casing portion to form a primary seal therewith, said casing portion having a radially inner margin which defines an annular opening inwardly of said margin and at said outer side of said seal assembly, said first, seal element portion including an axially directed collar portion which extends axially; at least partially into said annular opening, said collar being closely radially spaced apart from said margin of said casing.

2. A fluid seal assembly as defined in claim 1 in which said casing includes a radially extending imperforate leg at the outer side of the seal assembly, and in which said opening is defined between a portion of said leg and said second part.

3. A fluid seal assembly as defined in claim 1 in which said casing comprises a generally U-shaped enclosure which opens radially inwardly, and in which portions of said sealing element include a radially outer portion which extends into said enclosure and in which said primary sealing means is a sealing lip which bears against said casing, said sealing element also including a radially inward portion lying outside of said enclosure and in fluid-tight engagement with said second parts.

4. A fluid seal assembly as defined in claim 3 in which the first unit also includes a radially extending metallic stiffening element having seal-forming elastomeric material bonded thereto, a substantial portion of the outer surface of said metallic stiffening element being exposed to the atmosphere, and in which assembly said axially directed collar is radially spaced apart from said second part a substantial distance, and in which said exposed part of said stiffening element lies between said collar and said second part.

5. A fluid seal assembly as defined in claim 1 in which said sealing element includes secondary sealing means in engagement with said second unit at a sealing surface positioned between said primary sealing means and said annular opening.

6. An oil seal assembly for mounting between a pair of relatively movable parts, and for retaining an oil bath within an enclosed region, said assembly including a generally U-shaped casing comprising an axially directed base and a pair of radial walls of which an inner radial wall is adapted to be disposed adjacent said region, and of which an outer radial wall is at the opposite side of the assembly, said walls receiving therebetween a sealing member including a radially extending annular stamping, said stamping having a radially inward portion inclined in the direction toward the region, and a radially outward portion of said stamping being inclined in the opposite direction; said stamping being bonded to a tough flexible solid sealing member on the side of the stamping facing said region; said sealing member including an integral, radially inner annular static sealing portion adjacent a radially inward edge of said stamping, said sealing member including an integral excluder lip portion radially outwardly of said stamping, said sealing member including an axially extending sealing lip portion extending in the direction towards said region from said excluder lip portion, said sealing lip portion including a radially outwardly extending oil seal lip, said excluder lip and said oil seal lip being in continuous sealing contact with a portion of said base, said sealing member including an axially extending collar which extends axially outwardly from said stamping in the direction away from said region, said outer radial wall of said casing being relatively narrow and terminating in an inner edge thereof, said collar being radially spaced apart from said inner edge of said outer wall, said collar having an axially outermost annular face which is at least flush with the external radial face of said outer wall of said casing.

* * * * *